United States Patent
Cisneros et al.

(10) Patent No.: US 11,946,322 B2
(45) Date of Patent: Apr. 2, 2024

(54) WELL DRILLING APPARATUS INCLUDING A CHASSIS COMPONENT HAVING PRINTED ELECTRICAL INTERCONNECTIONS

(71) Applicant: Schlumberger Technology Corporation, Sugar Land, TX (US)

(72) Inventors: Carlos Cisneros, Cheltenham (GB); Anan Noel, Oklahoma City, OK (US); Pavel K. Byndyu, Tomsk (RU); Paul Linford, Stonehouse (GB); Gareth Markey, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/048,123

(22) Filed: Oct. 20, 2022

(65) Prior Publication Data
US 2023/0131982 A1    Apr. 27, 2023

Related U.S. Application Data

(60) Provisional application No. 63/262,810, filed on Oct. 21, 2021.

(51) Int. Cl.
*E21B 17/02*    (2006.01)
*B33Y 80/00*    (2015.01)

(52) U.S. Cl.
CPC ........... *E21B 17/0285* (2020.05); *B33Y 80/00* (2014.12)

(58) Field of Classification Search
CPC ........................... E21B 17/0285; B33Y 80/00
See application file for complete search history.

(56) References Cited

U.S. PATENT DOCUMENTS

| | | | |
|---|---|---|---|
| 5,542,472 A | 8/1996 | Pringle et al. | |
| 7,364,007 B2 * | 4/2008 | Garcia-Osuna | E21B 47/01 166/255.2 |
| 7,460,435 B2 * | 12/2008 | Garcia-Osuna | G01V 1/52 181/102 |
| 8,334,464 B2 * | 12/2012 | Edwards | H05K 3/1275 174/260 |
| 2006/0022592 A1 | 2/2006 | Boroson | |
| 2009/0303686 A1 * | 12/2009 | Hall | H05K 7/1417 361/752 |
| 2010/0055990 A1 * | 3/2010 | Madeley | H01R 13/187 439/675 |
| 2015/0273586 A1 * | 10/2015 | Ross | E21B 17/042 219/76.14 |
| 2016/0258242 A1 * | 9/2016 | Hayter | E21B 34/06 |
| 2018/0317328 A1 * | 11/2018 | Fenker | H05K 1/16 |

(Continued)

FOREIGN PATENT DOCUMENTS

EP    2159885 A2    3/2010

*Primary Examiner* — Taras P Bemko
(74) *Attorney, Agent, or Firm* — Jeffrey D. Frantz (57) ABSTRACT

An apparatus having one or more printed electrical interconnections is disclosed. The apparatus may include a chassis component of a drill string. The chassis component is configured to receive an electronic component. The apparatus also includes one or more printed electrical interconnections disposed proximate to the chassis. The one or more printed electrical interconnections are configured to communicatively connect with the electronic component.

20 Claims, 7 Drawing Sheets

(56) References Cited

U.S. PATENT DOCUMENTS

| | | | |
|---|---|---|---|
| 2021/0112660 A1* | 4/2021 | Arun | B33Y 80/00 |
| 2022/0131301 A1* | 4/2022 | Volkov | H01R 12/712 |
| 2023/0247758 A1* | 8/2023 | Sakthivel | H05K 3/0044 |
| | | | 174/250 |

* cited by examiner

WELL DRILLING APPARATUS INCLUDING A CHASSIS COMPONENT HAVING PRINTED ELECTRICAL INTERCONNECTIONS

CROSS-REFERENCE TO RELATED APPLICATIONS

This application claims the benefit of, and priority to, U.S. Patent Application No. 63/262,810, filed Oct. 21, 2021 and titled "Well Drilling Apparatus Including a Chassis Component Having Printed Electrical Interconnections", which application is incorporated herein by this reference in its entirety.

BACKGROUND

Oil wells are created by drilling a hole into the earth utilizing a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be utilized to cool the bit, lift rock cuttings, to the surface, at least partially prevent destabilization of the rock in the wellbore, and/or at least partially overcome the pressure of fluids inside the rock so that the fluids do not enter the wellbore.

SUMMARY

A method for fabricating one or more printed electrical interconnections through an additive manufacturing process is disclosed. The method may include forming a portion of a chassis component of a drill string through the additive manufacturing process and forming the one or more printed electrical interconnections proximate to the chassis component through the additive manufacturing process. The one or more printed electrical interconnections are configured to communicatively connect with an electronic component, and the chassis component is configured to receive the electronic component.

An apparatus having one or more printed electrical interconnections is also disclosed. The apparatus may include a chassis component of a drill string. The chassis component is configured to receive an electronic component. The apparatus also includes one or more printed electrical interconnections disposed proximate to the chassis. The one or more printed electrical interconnections are configured to communicatively connect with the electronic component.

A system including a chassis component having one or more printed electrical interconnections is also disclosed. The system may include a well-drilling apparatus for drilling a wellbore. In some embodiments, the well-drilling apparatus includes a drill string having a chassis component configured to receive an electronic component. The system may also include one or more printed electrical interconnections disposed proximate to the chassis component. The one or more printed electrical interconnections are configured to communicatively connect with the electronic component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The following description is provided with reference to the accompanying figures. The use of the same reference numbers in different instances in the description and the figures may indicate similar or identical items.

DETAILED DESCRIPTION

Electronic components and/or electronic modules for downhole tools can include electronic boards (e.g., printed circuit boards having electronic components disposed thereon, etc.) mounted to a chassis and interconnected to one another through wiring harnesses and soldered to connectors to provide electrical connections between the various electronic boards and components. Wiring harnesses generally comprise multiple wires bundled together to transfer electrical signals and power between the electronic boards. However, these wiring harnesses can be expensive, time consuming to assemble, or involve complex routing paths along the chassis and which introduce higher machining costs for each respective downhole tool. The soldered electrical connections and connectors may contribute to downhole electronic failures where the respective electrical connection reduces the reliability of the downhole tool.

The present disclosure is directed to an apparatus and a method for fabricating printed electrical interconnections proximate to the chassis through an additive manufacturing process. The electrical interconnections can include electrical tracks (e.g., paths that comprise conductive material such as wires, etc.) formed (e.g., fabricated) over a surface of the chassis or at least substantially within the chassis. In some embodiments, the chassis may comprise a chassis substrate that can receive a modular chassis component. In these embodiments, the modular chassis component employs the electrical interconnections to allow for interchangeability in the event that chassis substrate or the modular chassis component fails.

Figure 1:
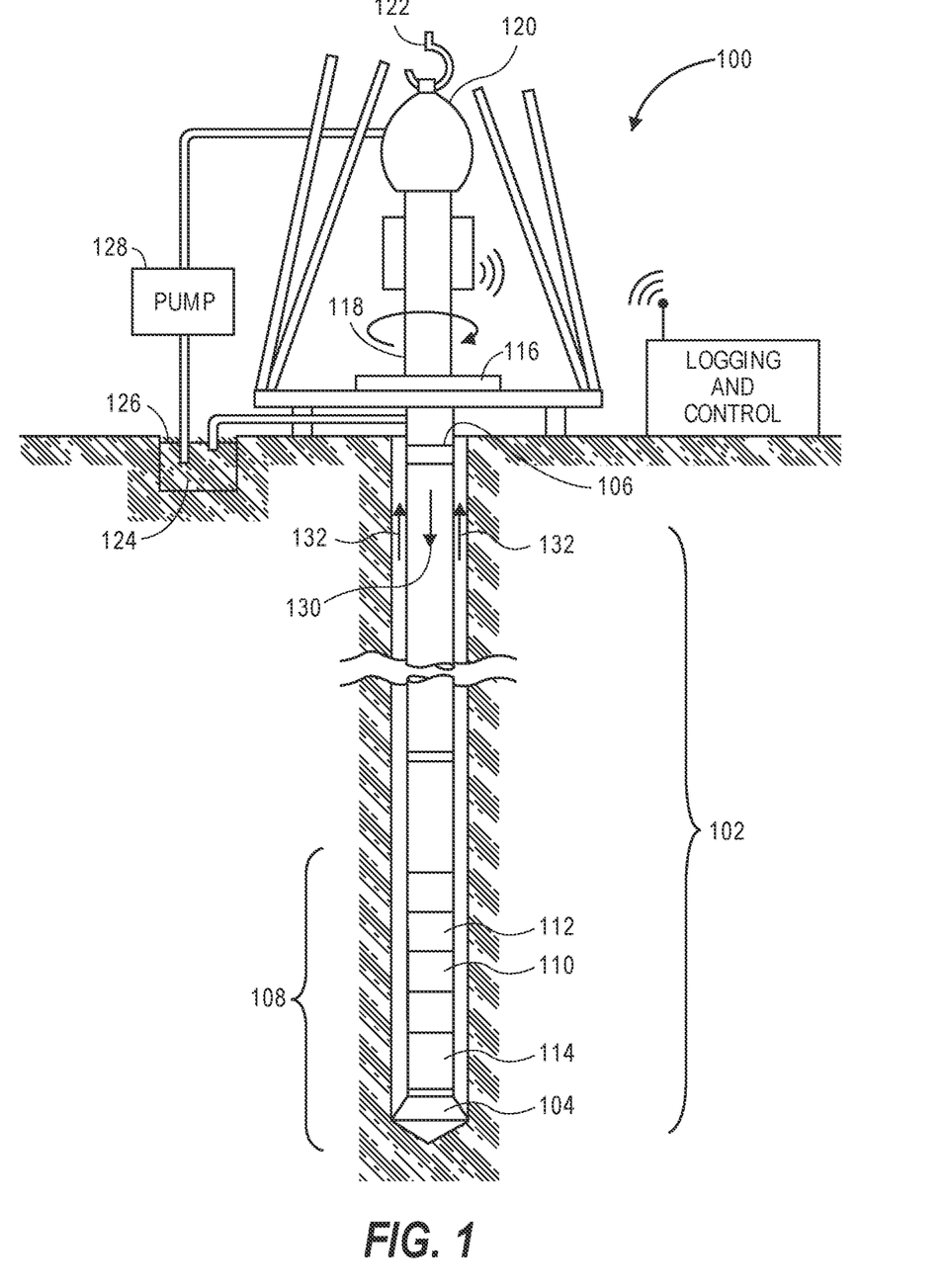
FIG. 1 is a diagrammatic illustration of a well-drilling apparatus in accordance with an example embodiment of the present disclosure.

FIG. 1 illustrates a wellsite system 100 in which a drill string 102 having a drill bit assembly 104 according to one embodiment of the invention can be employed. The wellsite can be onshore or offshore. The present disclosure depicts a vertical well but the disclosure is also applicable for horizontal well drilling. In FIG. 1, a borehole 106 is formed in subsurface formations by rotary drilling.

The drill string 102 is suspended within the borehole 106 and has a bottom hole assembly 108 which includes the drill bit assembly 104 at its lower end. The bottom hole assembly 108 of the illustrated embodiment comprises a measuring-while-drilling (MWD) module 110, a logging-while-drilling (LWD) module 112, a drill bit assembly 104, and a rotosteerable system and motor 114. The surface system includes platform and derrick assembly 10 positioned over the borehole 106, the wellsite system 100 including a rotary table 116, kelly 118, hook 122 and rotary swivel 120. The drill string 102 is rotated by the rotary table 116, energized by means not shown, which engages the kelly 118 at the upper end of the drill string. The drill string 102 is suspended from a hook 122, attached to a traveling block through the kelly 118 and a rotary swivel 120 which permits rotation of the drill string 102 relative to the hook 122.

In the example of this embodiment, the surface system further includes drilling fluid or mud 124 stored in a pit 126 formed at the well site. A pump 128 delivers the drilling fluid 124 to the interior of the drill string 102 via a port in the swivel 120, causing the drilling fluid to flow downwardly through the drill string 102 as indicated by the directional arrow 130. The drilling fluid exits the drill string 102 via ports in the drill bit assembly 104, and then circulates upwardly through the annulus region between the outside of the drill string and the wall of the borehole, as indicated by the directional arrows 132. The drilling fluid lubricates the drill bit assembly 104 and carries formation cuttings up to the surface as it is returned to the pit 126 for recirculation.

The LWD module 112 is housed in a drill collar and can contain one or a plurality of known types of logging tools. It will also be understood that more than one LWD and/or MWD module can be employed. The LWD module may include capabilities for measuring, processing, and storing information, as well as for communicating with the surface equipment.

The MWD module 110 is also housed in a drill collar and can contain one or more devices for measuring characteristics of the drill string and drill bit. The MWD tool further includes an apparatus for generating electrical power to the downhole system. This may typically include a mud turbine generator powered by the flow of the drilling fluid, it being understood that other power and/or battery systems may be employed. In the present embodiment, the MWD module may include one or more of the following types of measuring devices: a weight-on-bit measuring device, a torque measuring device, a vibration measuring device, a shock measuring device, a stick slip measuring device, a direction measuring device, and an inclination measuring device.

Figure 2:
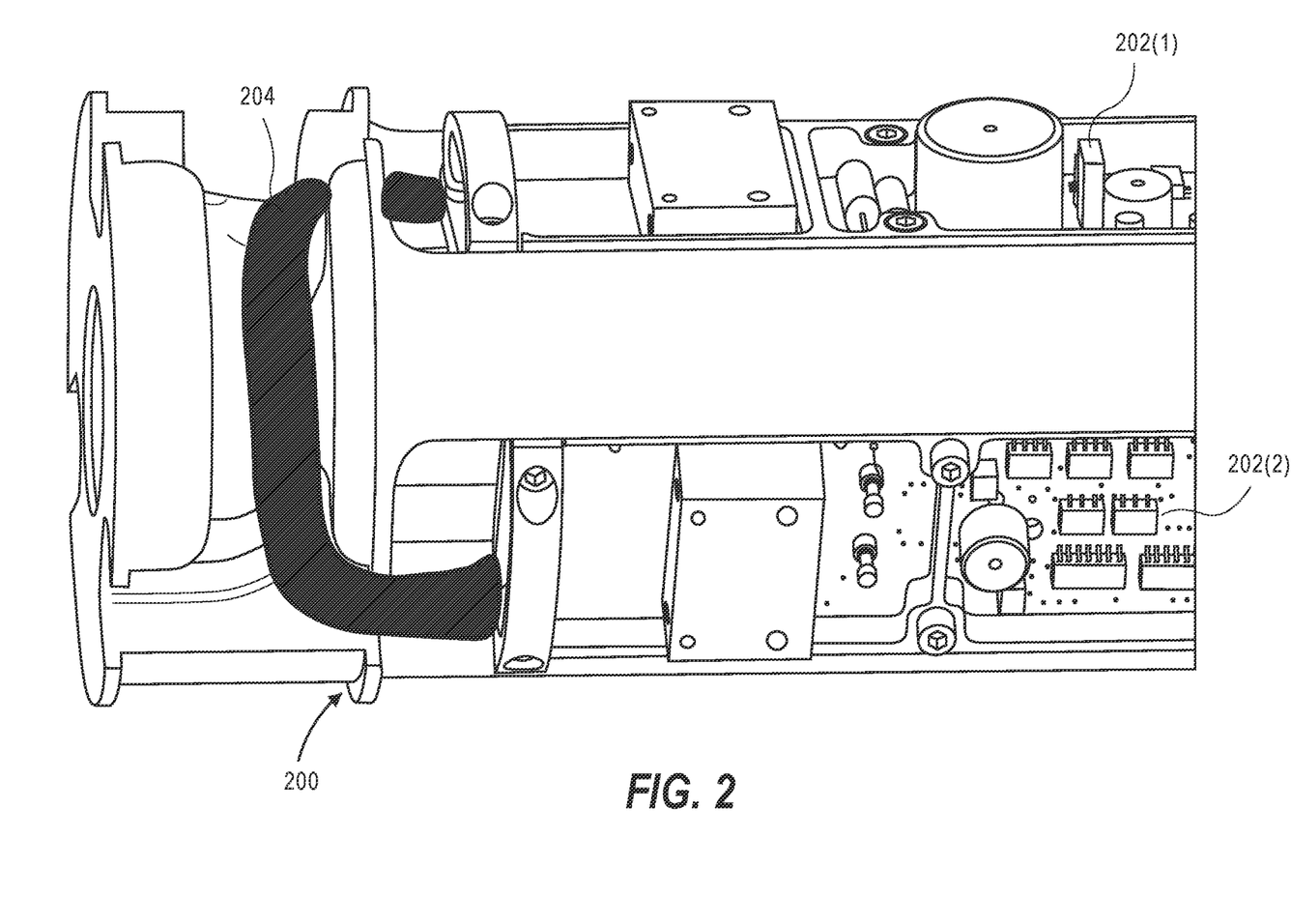
FIG. 2 is an isometric illustration of a chassis component of a drill string of the well-drilling apparatus shown in FIG. 1 in accordance with an example embodiment of the present disclosure, where the chassis component includes printed electrical interconnections that provide an electrical connection between various electronic components received by the chassis component.

The drill bit assembly 104 may comprise a rotary steerable (RSS) sub 114, such as the PowerDrive™ system manufactured by Schlumberger. As shown in FIG. 2, the RSS sub 114 employs a chassis 200 (e.g., a chassis component) with one or more electronic components 202 employed by the chassis 200. In one or more embodiments, as shown in FIG. 2, the electronics components 202 are mounted to the chassis 200 (e.g., a chassis component). The chassis 200 may employ multiple electronics components 202. In one or more embodiments, the electronics components 202 may comprise reservoir formation measurement components, electromagnetic (EM) transceiver equipment, or the like. The chassis 200 serves to provide stiffness to protect the electronic components 202 from the downhole environmental conditions, such as shock and vibration. Additionally, the chassis 200 may serve as a heat sink to draw heat from the thermally active electronic components. As shown, the electronics components 202(1) and 202(2) are electrically connected to one another through a printed electrical interconnection 204. The printed electrical interconnection 204 allows the electronics components 202(1) and 202(2) to transfer electrical signals and/or electrical power between the respective electronics components 202(1) and 202(2). It is contemplated that while two electronic components 202 are employed by the chassis 200, the present disclosure can employ multiple electronic components 202.

The printed electrical interconnection 204 can be printed proximate to the chassis 200 through an additive manufacturing (AM) process. In one or more embodiments, additive manufacturing processes create physical parts directly from a three dimensional (3-D) computer-aided design (CAD) file to control additive fabrication techniques. Suitable additive manufacturing techniques, sometimes also referred to as 3-D manufacturing, include stereolithography (SLA), selective laser sintering (SLS), fused deposition modeling (FDM), and three dimensional printing (3-DP). In some embodiments, these processes build a three dimensional solid part, layer-by-layer, by locally fusing or curing building materials that may be in powder or liquid form.

Figure 3:
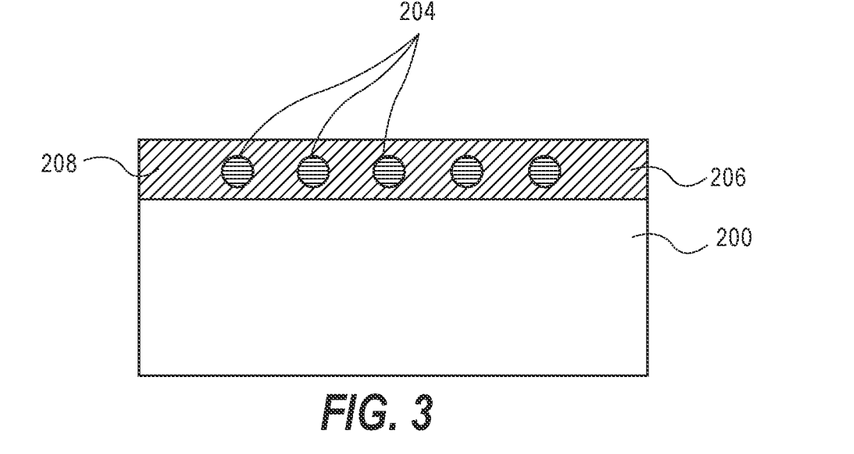
FIG. 3 is a cross-sectional diagram illustrating the chassis component shown in FIG. 2 in accordance with an example embodiment of the present disclosure, where the chassis component includes insulative layers formed over the surface of the chassis component and printed electrical interconnections disposed within the insulative layers.
Figure 4:
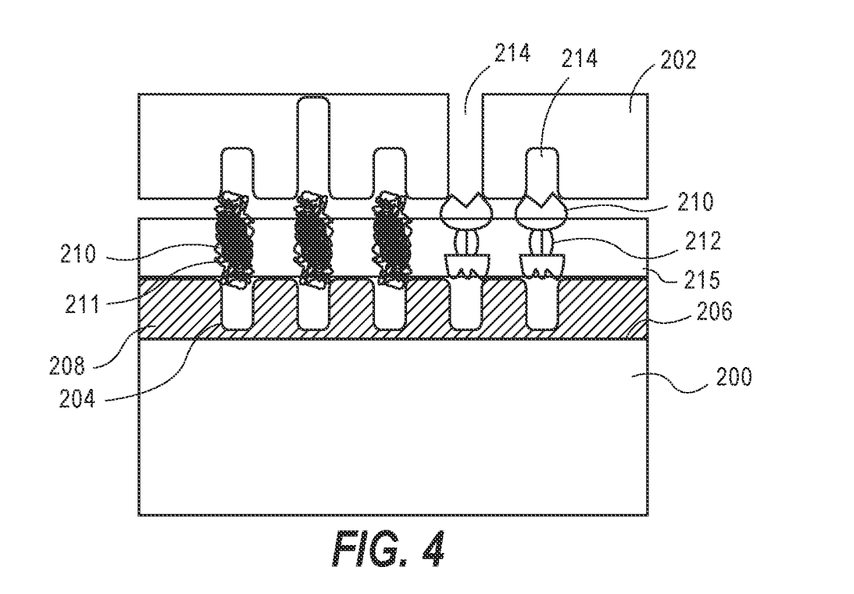
FIG. 4 is a cross-sectional diagram illustrating the chassis component shown in FIG. 2 in accordance with an example embodiment of the present disclosure, where the electrical connectors are positioned at terminated ends of the printed electrical interconnections to provide an electrical connection between the printed electrical interconnections and corresponding contacts of the electronic components received by the chassis component.

As shown in FIGS. 2 through 4, the printed electrical interconnection 204 is formed over a surface 206 of the chassis 200 through an additive manufacturing process. As shown in FIGS. 3 and 4, an insulative layer 208 is formed (e.g., printed) over the portion of the chassis 200 to receive the electrical interconnection 204. In one or more embodiments, the insulative layer 208 comprises a suitable insulative material, such as ceramic or the like. The printed electrical interconnection 204 is then formed proximate to the insulative layer 208. For instance, through the additive manufacturing process, individual wires or traces (e.g., individual electrical channels) that comprise the printed electrical interconnection 204 are printed over the chassis 200 within (e.g., defined within) the insulative layer 208. The insulative layer 208 serves to at least substantially isolate the electrical interconnection 204 (e.g., isolate the individual wires or traces from one another) and to isolate the printed electrical interconnection 204 from potential leak paths to other conductive components. If the chassis 200 comprises a non-metallic chassis, the printed electrical interconnections 204 can be formed directly over the surface of the non-metallic chassis.

FIG. 4 illustrates example electrical connectors 210 for providing an electrical connection between the respective electrical channels (e.g., wires, tracks, etc.) of the electrical interconnection 204 and the corresponding contacts 214 of the electronic components 202. For example, in one or more embodiments, the electrical connectors 210 serve to provide a conductive path to electrically connect the electrical interconnection 204 and corresponding electrical connections 214 deployed over the printed-circuit board (e.g., electronic component 202). As shown in FIG. 4, the electrical connections 214 can comprise internal electrical connections (e.g., electrical tracks, electrical channels) within the electronics component 202 (e.g., printed circuit board) or through-hole connections within the electronics component 202.

In one or more implementations, the electrical connectors 210 can comprise compression mount connectors 211. For instance, the electrical connectors 210 may comprise a conductive mesh that compresses between the terminated end (see FIG. 4) of the respective wires and the corresponding electrical connections(s) 214. The electrical connectors 210 may comprise a suitable conductive material, such as gold, copper, combinations thereof, or the like. In one or more embodiments, the electrical connectors comprise a solderless compression connector that comprises a randomly wound gold plated molybdenum wire formed in a cylindrical shape. The diameter of respective electrical connectors may range between 0.0118 inch (0.508 mm) and 0.040 inch (1.0116 mm). In some embodiments, a compression force of 2.5 ounces results in a contact resistance of less than twenty milli-ohms (20 mOhms). In some embodiments, the electrical connectors 210 uses less than thirty percent (30%) footprint as compared with standard 25-pin connectors. In some implementations, the electrical connectors 210 can comprise a pogo pin connector 212. In an implementation, a substrate 215 may be disposed between the insulative layer 208 (or the chassis 200) and the electronic component 202. The substrate 215 is configured to retain (e.g., hold) the electrical connectors 210 such that the electrical connectors 210 maintain electrical contact between the terminated portions of the electrical connectors 210 and the corresponding electrical connections 214. In one or more implementations, the substrate 215 may comprise a suitable polymer. For example, the substrate 215 may be comprised of a polyether ether ketone (PEEK) thermoplastic, or the like.

Figure 5:
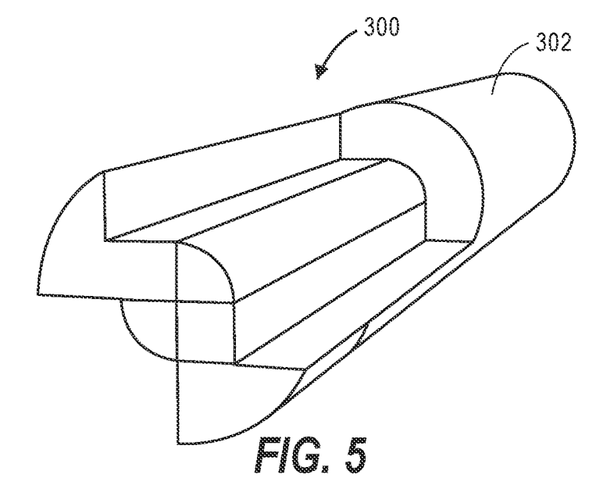
FIG. 5 is an isometric illustration of a chassis component of a drill string of the well-drilling apparatus shown in FIG. 1 in accordance with another example embodiment of the present disclosure, where the chassis component comprises a base chassis structure configured to receive a modular chassis structure.
Figure 6:
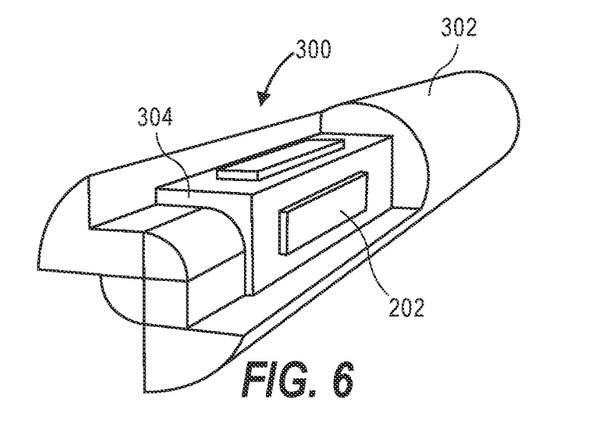
FIG. 6 is an isometric illustration of the base chassis structure shown in FIG. 5 in accordance with an example embodiment of the present disclosure, where the modular chassis structure is received at the base chassis structure and the modular chassis structure includes electronic components received thereon.

FIGS. 5 through 9 illustrate an example chassis 300 (e.g., a chassis component) and example modular chassis components 304 to be received by the chassis 300. In one or more embodiments of the present disclosure, the chassis 300 may comprise a base chassis structure 302 and the one or more modular chassis components 304 that provide interchangeability in the event that a modular chassis component is to be replaced (e.g., a defective modular chassis component, etc.). FIG. 5 illustrates the base chassis structure 302 configured to receive a modular chassis component 304, and FIG. 6 illustrates the base chassis structure 302 that has received a modular chassis component 304. In the event that the base chassis structure 302 or the one or more modular chassis components 304 become defective, the base chassis structure 302 and/or the one or more modular chassis components 304 can be interchanged (e.g., if a modular chassis component 304 becomes defective, that modular chassis component 304 can be removed and replaced with another modular chassis component 304). Thus, in some instances, the modular chassis components 304 are fabricated through a suitable additive manufacturing process, and the base chassis structure 302 can be fabricated through another suitable fabrication process. In some instances, the modular chassis components 304 are fabricated through a suitable additive manufacturing process, and the base chassis structure 302 are fabricated through a non-additive manufacturing process. In other instances, the modular chassis components 304 are fabricated through a suitable additive manufacturing process and the base chassis structure 302 are fabricated through the additive manufacturing process.

Figure 7:
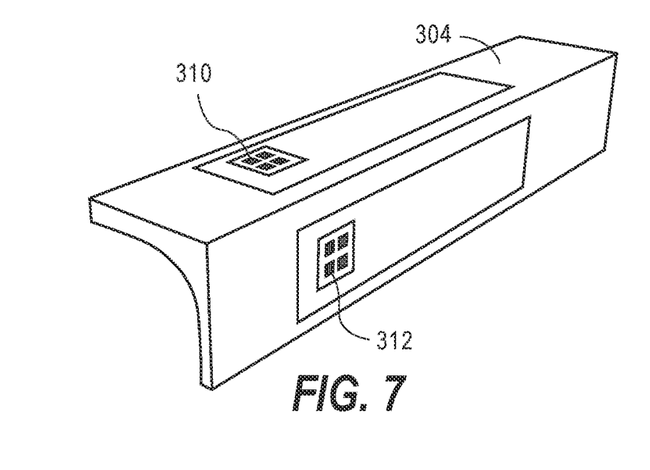
FIG. 7 is an isometric illustration of a modular chassis structure in accordance with an example embodiment of the present disclosure, where the modular chassis structure is configured to receive one or more electronic components and includes one or more terminated ends to electrically connect to the corresponding contacts of the electronic components.
Figure 8:
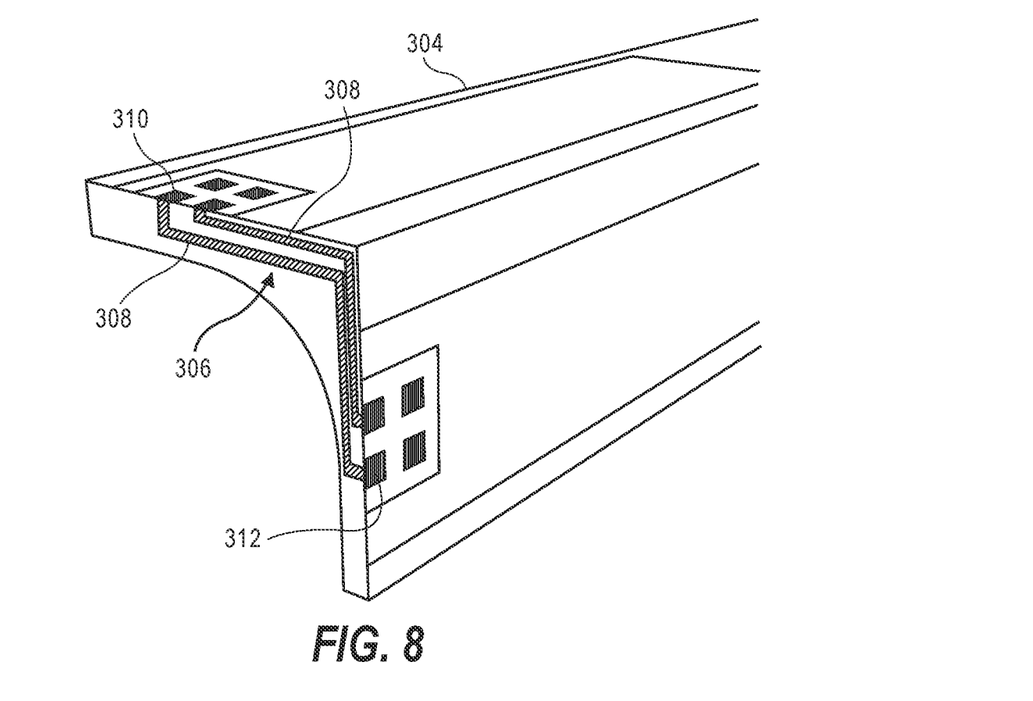
FIG. 8 is an isometric illustration of a modular chassis structure in accordance with an example embodiment of the present disclosure, where the modular chassis structure is formed through an additive manufacturing process and the modular chassis structure includes internally printed electrical interconnections.
Figure 9:
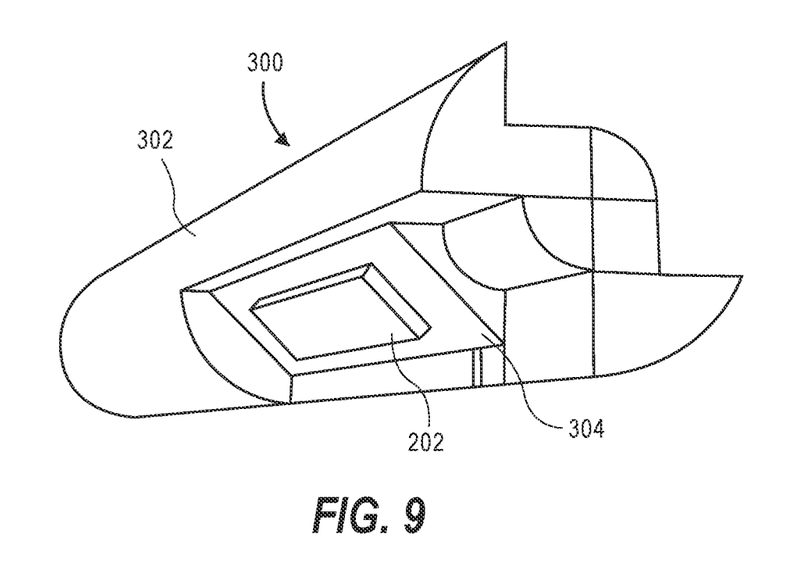
FIG. 9 is an isometric illustration of another modular chassis structure in accordance with an example embodiment of the present disclosure, where the modular chassis structure has received an electronic component.

As shown in FIGS. 7 and 8, the modular chassis component 304 is configured to provide internal printed electrical interconnections 306 (e.g., electrical channels or tracks) between various electrical components 202 retained by the modular chassis component 304. In one or more embodiments, modular chassis component 304 defines one or more conductive channels or tracks 308 having a conductive material disposed therein. The conductive material may comprise a suitable conductive material such as copper, gold, combinations thereof, or the like, that provides an electrical path between a first termination and a second termination (e.g., conductive pads). In some embodiments, the modular chassis component 304 may comprise a non-metallic modular chassis component to provide electrically insulative properties. In these embodiments, an insulative layer may not be utilized since the non-metallic modular chassis component provides electrically insulative properties. In other embodiments, the modular chassis component 304 may comprise a metallic modular chassis component to provide electrically insulative properties.

As shown in FIG. 8, the printed electrical interconnections 306 may be deployed internally within the modular chassis component 304 to provide an electrical connection between a first pad 310 (e.g., a first terminated end) to be connected to a first electronic component and a second pad 312 (e.g., a second terminated end) configured to be connected to a second electronic component. Thus, a respective electronic component can interface with a pad (e.g., first pad 310, second pad 312, etc.) such that the electronic component can communicate with another electronic component that is interfaced with another pad (e.g., the other of the first pad 310 or the second pad 312).

In an embodiment, the modular chassis components 304 may be constructed utilizing an additive manufacturing (AM) process, as described above. Thus, the modular chassis component 304 can be built layer-by-layer. As such, the modular chassis component 304 includes the printed electrical interconnections 306 while the base chassis structure 302 provides the structural support. Thus, in the event of an electrical interconnection failure, the modular chassis component 304 can be replaced with another modular chassis component 304 while the base chassis structure 302 can be retained for future usage within the drill string assembly 104.

Figure 10:
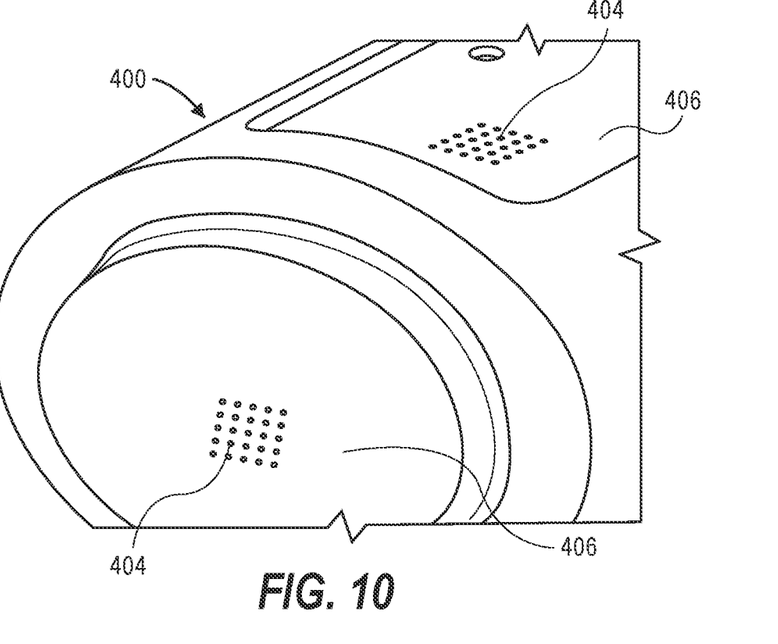
FIG. 10 is an isometric illustration of a chassis component of a drill string of the well-drilling apparatus shown in FIG. 1 in accordance with another example embodiment of the present disclosure, where the chassis component is formed through an additive manufacturing process and includes internally printed electrical interconnections.
Figure 11:
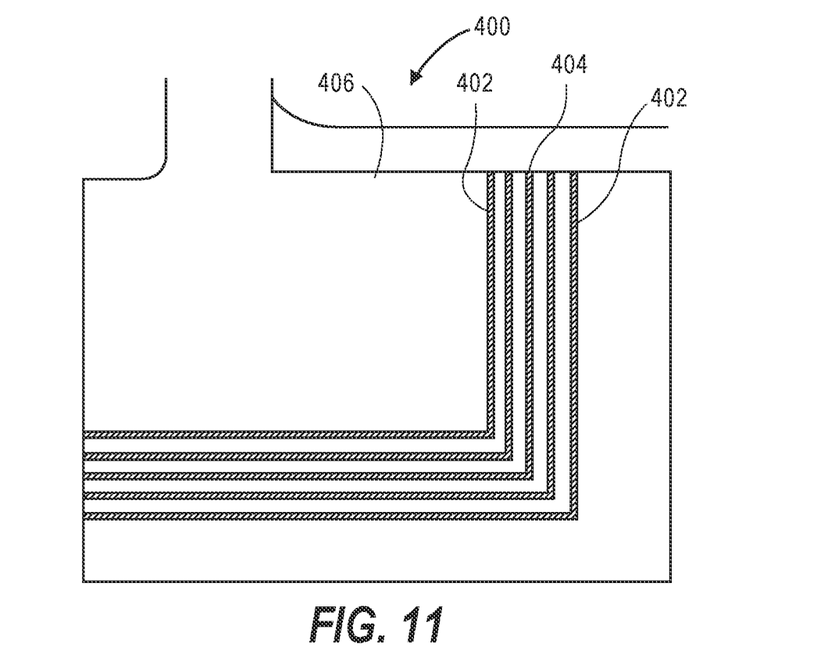
FIG. 11 is a cross-sectional illustration of the chassis component shown in FIG. 10 in accordance with an example embodiment of the present disclosure, where the printed electrical interconnections are defined within the chassis component.

FIGS. 10 and 11 illustrate a chassis 400 (e.g., a chassis component) including an internally printed electrical interconnection 402 (e.g., electrical channels or tracks) disposed within the chassis 400. In this embodiment, the chassis 400 is fabricated through a suitable additive manufacturing process. The printed electrical interconnection(s) 402 are defined within the chassis 400 and a conductive material is disposed within the respective electrical channels or tracks defining the printed electrical interconnection 402. During formation of the chassis 400, a 3-D printer may print the electrical interconnections 402 within the chassis 400 structure as shown in FIGS. 10 and 11. In some implementations, during fabrication, an insulative layer may be formed (e.g., printed) within the chassis 400 such that the insulative layer is disposed between the chassis 400 and the conductive material to provide insulative properties between the conductive material and the chassis 400. In one or more embodiments, the chassis 400 may comprise a metallic chassis (e.g., chassis constructed utilizing metallic materials). In other embodiments, the chassis 400 may comprise a non-metallic chassis (e.g., a chassis constructed utilizing non-metallic materials). As shown in FIGS. 10 and 11, the printed electrical interconnection(s) 402 are terminated (terminated ends 404) proximate to a surface 406 of the chassis 400. The chassis 400 is configured to receive electronic components 202 and the corresponding pads of the electronic components 202 are configured to interface with the corresponding terminated ends 404 of the printed electrical interconnection 402 at the surface 406.

Figure 12:
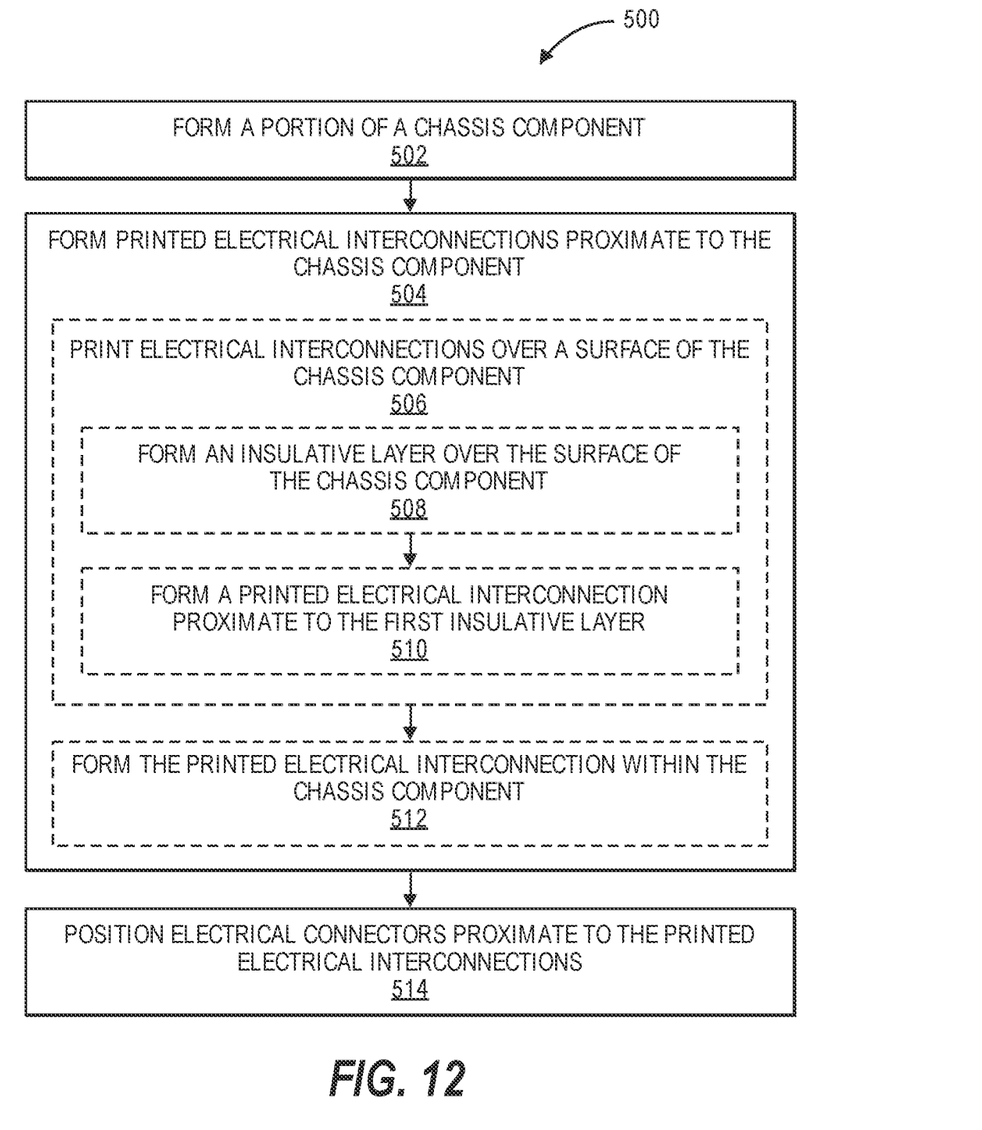
FIG. 12 is a flow diagram illustrating an example method of forming (e.g., fabricating) printed electrical interconnections proximate to a chassis component of a drill string in accordance with an example embodiment of the present disclosure.

FIG. 12 illustrates an example process 500 for fabricating a chassis (e.g., a chassis component) having printed electrical interconnections through an additive manufacturing fabrication process. For instance, a computer-aided design (CAD) file representing the design (e.g., object) to be fabricated is received at a computing device. The computing device is in communication with a three-dimensional (3-D) printer and utilizes the CAD file to instruct the 3-D printer how to fabricate the object according to the design. In one or embodiments, the additive manufacturing fabrication process may employ a "bottoms-up" building method in which the chassis and/or electrical interconnects is built layer-by-layer on a supporting platform. The individual platform transitions down as the individual layers are formed. The three-dimensional (3-D) printer may employ one or more print heads that is transitioned around the platform to form the respective layers.

As shown in FIG. 12, a portion of a chassis component is formed (Block 502). In one or more embodiments, a portion of a chassis (e.g., the chassis 200 as shown in FIGS. 2 through 4, the modular chassis component 304 shown in FIGS. 6 through 9, or the chassis 400 shown in FIGS. 10 and 11) is formed through an additive manufacturing process.

Referring to FIG. 12, printed electrical interconnections are formed proximate to the chassis component (Block 504). As described above, during formation of the chassis component, a printed electrical interconnection is formed (e.g., fabricated) on or within the chassis component through the additive manufacturing process. For instance, a conductive material that comprises an electrical conduit (e.g., an electrical wire or track) may be formed (e.g., printed) over a surface of chassis component (Block 506). In an embodiment, as described above, the 3-D printer prints conductive material over a surface of the chassis component (see FIGS. 3 and 4). In this embodiment, an insulative layer is formed (e.g., printed) over a surface of the chassis (Block 508). A printed electrical interconnection is then formed proximate to the insulative layer (Block 510). As described above, the printed electrical interconnection 204 can comprise multiple individual conductive conduits (e.g., electrical tracks, electrical channels, etc.) that are defined within the insulative layer(s) 208. For instance as shown, the insulative layer(s) 208, once formed, substantially encapsulate the printed electrical interconnections 204.

In another instance, the printed electrical interconnections (e.g., electrical channels) are formed within the chassis component (Block 512). In this embodiment, the 3-D printer forms (e.g., fabricates) one or more layers that comprise the chassis component. The 3-D printer may then form one or more layers that define the electrical tracks that define the electrical path such that the electrical tracks are at least substantially defined within the chassis component upon completion of the additive fabrication process (see FIGS. 8 and 10).

As shown in FIG. 12, one or more electrical connectors are positioned proximate to the one or more printed electrical interconnections (Block 514). As described above, the chassis component 200, 300, 400 can employ one or more electrical connectors 210 to serve as an electrical connection between the printed electrical interconnections 204, 306, 402 and corresponding contacts (e.g., contacts 214 shown in FIG. 4) of the electronic components 202. In one or more embodiments, the electrical connectors 210 can comprise compression mount connectors 211 or pogo pins 212. The electrical connectors 210 can be positioned at the terminated ends of the electrical interconnections 204, 306, 402 through a suitable positioning and/or mounting process.

Although only a few example embodiments have been described in detail above, those skilled in the art will readily appreciate that many modifications are possible in the example embodiments without materially departing from "Well Drilling Apparatus Including a Chassis Component Having Printed Electrical Interconnections." Accordingly, one or more of the modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke functional claiming for any limitations of any of the claims herein, except for those in which the claim expressly uses the words 'means for' or 'step for' together with the associated function.

What is claimed is:

1. A method for fabricating one or more printed electrical interconnections through an additive manufacturing process, the method comprising:

forming a portion of a chassis component of a drill string through the additive manufacturing process;

forming the one or more printed electrical interconnections proximate to the chassis component through the additive manufacturing process, the one or more printed electrical interconnections configured to communicatively connect with at least one electronic component, the chassis component configured to receive the at least one electronic component; and positioning at least one electrical connector proximate to a terminated portion of the one or more printed electrical interconnections, wherein the at least one electrical connector is configured to provide an electrical connection between a respective printed electrical interconnection of the one or more printed electrical interconnections and a corresponding contact of the at least one electronic component, and wherein the at least one electrical connector comprises at least one of a compression mount connector or a pogo pin.

2. The method as recited in claim 1, wherein forming the portion of the chassis component further comprises forming a modular chassis component, the modular chassis component configured to be received by a base chassis structure.

3. The method as recited in claim 1, further comprising:
    forming an insulative layer over a surface of the chassis component; and
    forming the one or more printed electrical interconnections proximate to the insulative layer.

4. The method as recited in claim 3, wherein the insulative layer comprises a ceramic material.

5. The method as recited in claim 1, wherein forming the one or more printed electrical interconnections further comprises forming the one or more printed electrical interconnections directly over a surface of the chassis component.

6. The method as recited in claim 1, wherein the compression mount connector comprises a diameter ranging between 0.0118 inch (0.508 mm) and 0.040 inch (1.0116 mm).

7. The method as recited in claim 1, wherein the at least one electrical connector comprises the compression mount connector.

8. The method as recited in claim 1, wherein the at least one electrical connector comprises the pogo pin.

9. An apparatus comprising:
    a chassis component of a drill string, the chassis component configured to receive at least one electronic component;
    one or more printed electrical interconnections disposed proximate to the chassis component, the one or more printed electrical interconnections configured to communicatively connect with the at least one electronic component; and
    at least one electrical connector disposed proximate to a terminated portion of the one or more printed electrical interconnections,
    wherein the at least one electrical connector is configured to provide an electrical connection between a respective printed electrical interconnection of the one or more printed electrical interconnections and a corresponding contact of the at least one electronic component, and
    wherein the at least one electrical connector comprises at least one of a compression mount connector or a pogo pin.

10. The apparatus as recited in claim 9, wherein the chassis component comprises a modular chassis component, the modular chassis component configured to be received by a base chassis structure.

11. The apparatus as recited in claim 9, further comprising an insulative layer disposed over a surface of the chassis component, wherein the one or more printed electrical interconnections are disposed within the insulative layer.

12. The apparatus as recited in claim 11, wherein the insulative layer comprises a ceramic material.

13. The apparatus as recited in claim 9, wherein the one or more printed electrical interconnections are disposed directly over a surface of the chassis component.

14. The apparatus as recited in claim 9, wherein the compression mount connector comprises a diameter ranging between 0.0118 inch (0.508 mm) and 0.040 inch (1.0116 mm).

15. The apparatus as recited in claim 9, wherein the at least one electrical connector comprises the compression mount connector.

16. The apparatus as recited in claim 9, wherein the at least one electrical connector comprises the pogo pin.

17. A system comprising:
    a well-drilling apparatus for drilling a wellbore, the well-drilling apparatus including a drill string comprising a chassis component configured to receive at least one electronic component;
    one or more printed electrical interconnections disposed proximate to the chassis component, the one or more printed electrical interconnections configured to communicatively connect with the at least one electronic component; and
    at least one electrical connector disposed proximate to a terminated portion of the one or more printed electrical interconnections,
    wherein the at least one electrical connector is configured to provide an electrical connection between a respective printed electrical interconnection of the one or more printed electrical interconnections and a corresponding contact of the at least one electronic component, and
    wherein the at least one electrical connector comprises at least one of a compression mount connector or a pogo pin.

18. The system as recited in claim 17, wherein the chassis component comprises a modular chassis component, the modular chassis component configured to be received by a base chassis structure.

19. The system as recited in claim 17, further comprising an insulative layer disposed over a surface of the chassis component, wherein the one or more printed electrical interconnections are defined within the insulative layer.

20. The system as recited in claim 17, wherein the one or more printed electrical interconnections are disposed directly over a surface of the chassis component.

* * * * *